Feb. 5, 1957  D. C. HARVEY ET AL  2,780,152
DOUBLE SHUTTER TRIGGER LOCK
Filed Sept. 3, 1953  2 Sheets-Sheet 1
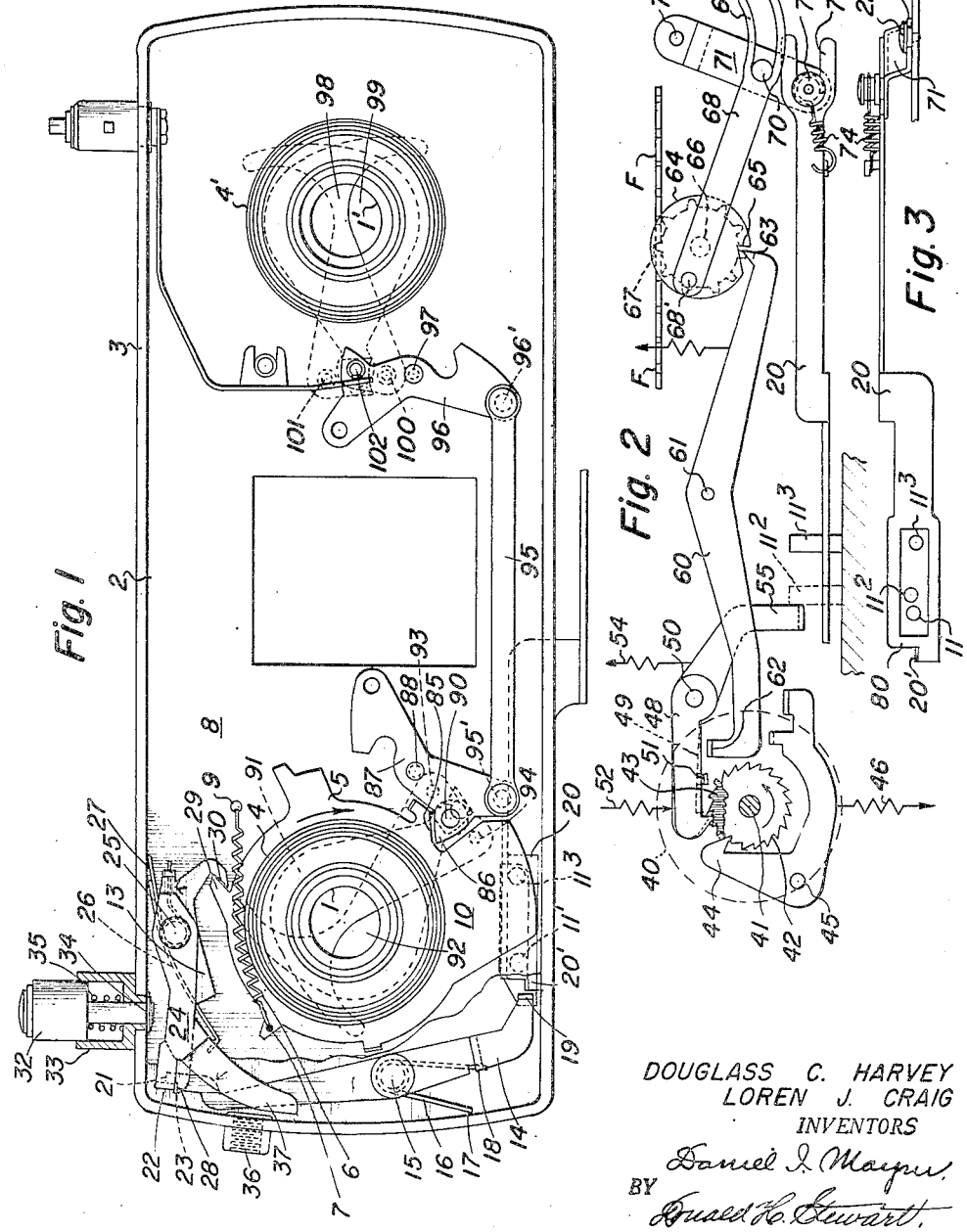
DOUGLASS C. HARVEY
LOREN J. CRAIG
INVENTORS
BY
ATTORNEYS Feb. 5, 1957  D. C. HARVEY ET AL  2,780,152
DOUBLE SHUTTER TRIGGER LOCK
Filed Sept. 3, 1953  2 Sheets-Sheet 2
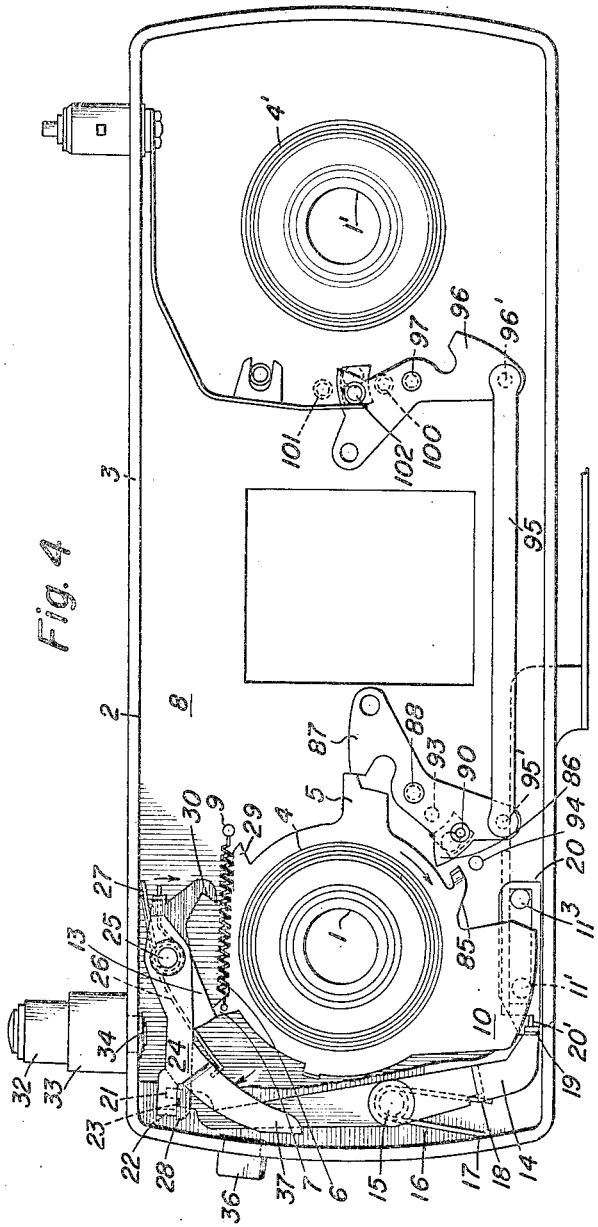
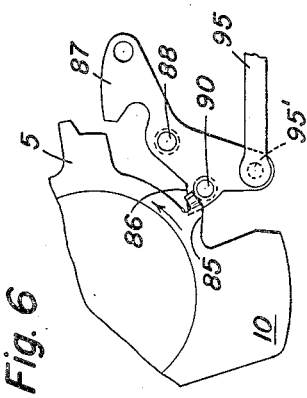
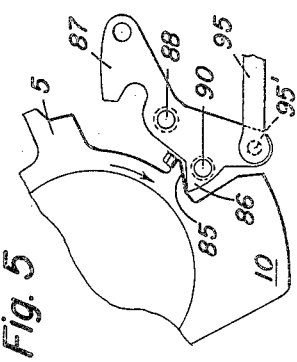
DOUGLASS C. HARVEY
LOREN J. CRAIG
INVENTORS
BY
ATTORNEYS

2,780,152

DOUBLE SHUTTER TRIGGER LOCK

Douglass C. Harvey and Loren J. Craig, Rochester, N. Y., assignors to Eastman Kodak Company, Rochester, N. Y., a corporation of New Jersey Application September 3, 1953, Serial No. 378,244

2 Claims. (Cl. 95—31)

This invention relates to photography, and particularly to shutter trigger locks for camera shutters.

Shutter trigger locks have been proposed for latching shutter triggers when the shutter mechanism is in an unset position. Other types have been effective under certain conditions such as the position of a film in a camera but in almost all cases known to applicant there are certain conditions which must be present before the latch functions and under other conditions it may be possible to operate the shutter improperly.

An object of the present invention is to provide a structure which will be effective under practically all positions of the apparatus in which the shutter should be locked. Another object is to provide a latching system for shutters in which the trigger may be latched not only before a shutter is being set but also while the shutter is being set. Another object of the invention is to provide a shutter trigger latching mechanism which is simple and inexpensive and other objects will appear from the following specification, the novel features being pointed out in the claims at the end thereof.

Coming now to the drawings wherein like reference characters denote like parts throughout:

Fig. 1 is a top plan view of a shutter with a shutter cover removed illustrating a preferred embodiment of our invention, certain unessential parts being omitted to better illustrate the invention;

Fig. 2 is a schematic diagrammatic side elevation of a film winding mechanism;

Fig. 3 is a view similar to Fig. 2 but showing a top plan view of only some of the parts shown in Fig. 2;

Fig. 4 is similar to Fig. 1 but with the parts shown in a rest position with the shutter in an unset condition;

Fig. 5 is a fragmentary detail plan view with the shutter parts set and ready for an exposure;

Fig. 6 is a view similar to Fig. 5, but with the shutter drive ring being set;

It is desirable to lock a shutter against actuation until the film is wound and to lock the shutter release so that it can only be actuated when the shutter has been set. To this end, in accordance with our invention, the shutter is provided with two locks operable in timed relation, one on an actuating ring so that a trigger cannot be depressed after an exposure and before the shutter is set, and the other to hold the trigger against actuation after the shutter setting movement starts and up to the time the film winding movement is completed. These locks coact to provide a substantially foolproof apparatus, one latch taking over where the other latch leaves off.

The drawings show a shutter for a stereo-camera shutter although obviously our invention is not limited to such a shutter and is equally applicable to single shutters for regular single exposure cameras.

As shown in Fig. 1, there is a pair of spaced exposure openings 1 and 1' in an elongated shutter casing 2 having an upstanding flange about its periphery. There is a cover, not shown, which rests upon flange 3. Two ring flanges 4 and 4', about the former of which a drive ring 5 is mounted to swing, are carried by the shutter casing. A driving spring 6, connected to the drive ring 5 by a lug 7 and to the shutter mechanism plate 8 by a pin 9, tends to turn the drive ring in one direction. The shutter mechanism is similar to the mechanism shown in U. S. Patent 2,500,034, Hodges, Camera Shutter Trigger Latch and Stop, granted March 7, 1950.

The drive ring 5 includes a flange 10 carrying a pin 11 by which the drive ring may be set when the film is wound. In addition, drive ring 5 carries a lug 7 which, as shown in Fig. 4, has a rest or nonset position lying beneath a trigger latch member 13. When this lug 7 is moved, as by setting the shutter, it moves from a trigger blocking position, as shown in Fig. 1, so an additional latch is desirable.

A second latch 14 is pivoted on stud 15 to the back of the shutter casing 2 and is normally thrust in a counterclockwise direction by a spring 16 encircling this stud and resting on an end 17 of the shutter casing and against a shoulder 18 of lever 14. One end 19 of this lever lies in the path of a slide 20, and the opposite end 21 has a shoulder 23 adapted to normally engage and lie under the flange 22 of the trigger latch member 24 to hold it against movement, as shown in Fig. 1, releasing the latch member 24, Fig. 4, when the slide 20 in moving to the extreme end of its path of movement moves lever 14 about its pivot 15 and against the spring 16.

The shutter latch is made of two parts 13 and 24 coaxially pivoted on the stud 25. A relatively heavy spring 26 tends to turn release latch member 24 clockwise and a relatively light spring 27 tends to turn release latch element 13 clockwise, a tail 28 on latch element 13 normally engaging flange 22 to turn latch element 24 with it. But latch element 13 may turn counterclockwise independently of latch element 24 so that only the light spring resists setting movement when the drive ring 5 latch 29 engages and moves hook 30 of latch element 13.

The latch elements 13 and 24 may be operated by a push button 32 slidably mounted in tubular member 33 to push an operating head 34 against latch 24. A spring 35 holds the button normally raised. A cable release of known type may be threadedly engaged with the ferrule 36 to operate arm 37 of latch lever 24 if such a release should be wanted.

The film winding mechanism which forms no part of this invention and which is fully described in a copending application Serial No. 394,020, filed November 24, 1953, for Film Metering and Shutter Setting Mechanism, R. G. Elton, will be described only to show the setting mechanism for the drive ring 10. Referring to Figs. 2 and 3, there is a film winding knob 40 on a shaft 41 carrying a pair of ratchet wheels 42 and 43 with teeth inclined in opposite directions. A rewind pawl 44 pivoted at 45 may engage ratchet 42 being normally drawn into engagement therewith by spring 46. There is a double pawl 48 and 49 both pivoted on a stud 50 and both capable of engaging the ratchet 43. Pawl 49 has an upturned lug 51 to engage pawl 48. A spring 52 presses pawl 49 into engagement with ratchet 43 and pawl 49 is pulled in a counterclockwise direction by its spring 54. Pawl 49 includes a tail 55 lying in the path of the shutter setting pin 11. Both pawls may therefore be released together. The two pawls 48 and 49 are arranged in staggered relation so that they engage at half tooth spacing in the teeth of the ratchet 43.

A lever 60 pivoted at 61 has a flanged end 62 adapted to release pawls 48 and 49 from ratchet 43 when rocked by cam follower 63 which may ride on the cam 64 or drop into the stop notch 65 thereof. Cam 64 is carried by a shaft 66 also carrying a ten-toothed sprocket 67 adapted to engage and be driven by film perforations of a known type of film.

A crank 68 is pivoted to cam 64 at 68' and includes a curved slotted end 69 engaging pin 70 on a lever 71 pivoted at 72. A second pin 73 on lever 71 is held by a spring 74 in a forked end 75 of a slide 20 having a flanged end 20' to engage the end 19 of lever arm 14.

When film is wound by turning knob 40, film F is drawn over sprocket 67 turning crank 68 and rocking lever 71 back and forth as film is wound. This causes slide 20 to move back and forth from a rest position, Fig. 4, through a cycle moving first from left to right and then back from right to left with respect to Figs. 1 and 4 as the sprocket 67 makes one revolution of 360°. This causes the end 80 of the slot to move pin 11 from the 11' position to the $11^3$ position, Figs. 2 and 3, and when the latter position is reached, hook 30 engages and moves past trigger latch member 13 and becomes engaged with the hook 29 carried thereby. The shutter drive ring is then set. As pin 11 is moved toward its rest or non-set position, it reaches position $11^2$ where it strikes and moves tail 55 of pawls 48 and 49 so that continued movement to position 11' will hold these pawls inoperative and allow knob 40 to be turned to wind film. At the same time, lug 7 of the drive ring 5 will have moved under trigger latch 13 and prevent movement of the release button 32 or cable release screwed into ferrule 36.

The shutter drive ring 5 includes a cam 85 which, when moved by spring 6, engages cam 86 of lever 87 pivoted at 88 to the mechanism plate 8. Thus, as lever 87 rocks, an operating pin 90 engaging shutter blades 91 and 92 causes them to open and close as they each rock about their respective pivots 93 and 94, as shown in Figs. 1 and 4. Fig. 6 shows the shutter drive ring moving so that the cam 85 rides over the cam 86 as occurs in setting the shutter.

In the present instance, a connecting rod 95 pivoted at 95' to lever 87 connects a second pivoted lever 95 by pivot 96' to drive ring 5. Thus, this lever, as it turns on stud 97, moves shutter blades 98 and 99 about their pivots 100 and 101 in synchronism with blades 91 and 92 because of the stud 102 which engages these blades. This is only necessary where a stereo shutter is involved. If only a single shutter is employed, the connecting rod 95 and the rest of the mechanism for stereo shutters is omitted.

With the preferred embodiment of our invention as described above, the shutter is only unlatched for actuation at the extreme end of the film winding movement. When film is being wound, lever 14 is in an operative latching position because spring 16 moves the end 21 beneath lug 22 of trigger latch element 24. This latch is only released as slide 20 reaches the end of its winding cycle engaging parts 19 of lever 14 and 20' of slide 20, thus moving lever 14 to its Fig. 4 position. When in the Fig. 4 position and when the shutter drive ring 5 is in its rest or unset position, lug 7 lies under trigger latch member 13. Thus, the two latching devices, shutter trigger latch members 13 and 24, and shutter trigger latch lever 14 coact in timed relation to insure against improper actuation of the camera shutter.

Having thus described our invention, what we claim is new and desire to secure by Letters Patent of the United States is:

1. A trigger lock for shutters including a drive ring, a spring for operating the drive ring, a latch for holding the ring in a set position and a trigger for releasing the latch in combination with a roll-holding camera including a film wind, a film measuring roll engaging a film as an area is positioned for an exposure, and shutter setting mechanism including a shutter setting member operably connected to the film measuring roll to be moved backward and forward thereby as a film area is advanced for exposure, two trigger locking devices, the first one carried by the drive ring of the shutter and the second coacting with the shutter setting mechanism, the former holding the trigger against movement when the shutter has been released by the trigger after making an exposure and the latter normally holding the trigger against operation and being released only when the film wind has substantially completed a film winding operation, the first trigger locking device for holding the drive ring in a set position including two parts, a first part including a hook for engaging a latch element on the drive ring and a second part including a flange engaging the first part to turn it in one direction, a relatively heavy spring tending to turn the second part in one direction, a relatively light spring tending to turn the first part in the same direction to latch the drive ring, only the first part with the relatively light spring opposing the engagement of the drive ring trigger latch as the shutter is set, the second part latching the trigger during the first part of the movement of the shutter setting backward movement and the second part latching the trigger until the forward movement of the shutter setting lever is substantially completed whereby the shutter cannot be operated during the film winding operation.

2. A trigger lock for shutters including a drive ring, a spring for operating the drive ring, a latch for holding the ring in a set position and a trigger for releasing the latch in combination with a roll-holding camera including a film wind, a film measuring roll engaging and turning with a film as an area is positioned for an exposure, and shutter setting mechanism including a shutter setting member in the form of a crank pivotally connected to the film measuring roll to be moved backward and forward thereby as a film area is advanced for exposure, two trigger locking devices, the first one carried by the drive ring of the shutter and the second coacting with the shutter setting mechanism, the former holding the trigger against movement when the shutter has been released by the trigger after making an exposure and the latter normally holding the trigger against operation and being released only when the film wind has substantially completed a film winding operation moving the crank back and forth, the first trigger locking device for holding the drive ring in a set position including two parts, a first part including a hook for engaging a latch element on the drive ring and a second part including a flange engaging the first part to turn it in one direction, a relatively heavy spring tending to turn the second part in one direction, a relatively light spring tending to turn the first part in the same direction to latch the drive ring, only the first part with the relatively light spring opposing the engagement of the drive ring trigger latch as the shutter is set, the second part latching the trigger during the first part of the movement of the shutter setting backward movement of the crank and the second part latching the trigger until the forward movement of the shutter setting lever crank is substantially completed whereby the shutter cannot be operated during the film winding operation.

References Cited in the file of this patent
UNITED STATES PATENTS

| | | |
|---|---|---|
| 2,148,636 | Muller et al. | Feb. 28, 1939 |
| 2,183,802 | Zinzelsberger | Dec. 19, 1939 |
| 2,267,518 | Burger | Dec. 23, 1941 |
| 2,398,418 | Crumrine | Apr. 16, 1946 |
| 2,500,034 | Hodges | Mar. 7, 1950 |